United States Patent
Li et al.

(10) Patent No.: US 9,859,960 B2
(45) Date of Patent: Jan. 2, 2018

(54) METHOD AND SYSTEM FOR INDICATING TRANSMISSION PARAMETER

(75) Inventors: Yu Ngok Li, Shenzhen (CN); Bo Dai, Shenzhen (CN); Yunfeng Sun, Shenzhen (CN); Jun Xu, Shenzhen (CN); Junfeng Zhang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 187 days.

(21) Appl. No.: 13/520,283

(22) PCT Filed: Feb. 11, 2011

(86) PCT No.: PCT/CN2011/070945
§ 371 (c)(1),
(2), (4) Date: Jul. 2, 2012

(87) PCT Pub. No.: WO2011/124099
PCT Pub. Date: Oct. 13, 2011

(65) Prior Publication Data
US 2013/0235811 A1    Sep. 12, 2013

(30) Foreign Application Priority Data
Apr. 6, 2010 (CN) .......................... 2010 1 0142009

(51) Int. Cl.
*H04W 72/04* (2009.01)
*H04B 7/0452* (2017.01)
(Continued)

(52) U.S. Cl.
CPC ........... *H04B 7/0452* (2013.01); *H04B 7/063* (2013.01); *H04W 28/18* (2013.01); *H04W 48/08* (2013.01)

(58) Field of Classification Search
USPC ............... 370/328, 329, 203; 455/562, 101; 375/141, 296; 714/748
See application file for complete search history.

(56) References Cited

U.S. PATENT DOCUMENTS

2002/0193146 A1* 12/2002 Wallace et al. ............... 455/562
2006/0182191 A1*  8/2006 Darwood et al. ............. 375/267
(Continued)

FOREIGN PATENT DOCUMENTS

CN    101631374 A    1/2010
CN    101834629 A    9/2010
(Continued)

OTHER PUBLICATIONS

International Search Report for PCT/CN2011/070945.
(Continued)

*Primary Examiner* — Edan Orgad
*Assistant Examiner* — Sithu Ko
(74) *Attorney, Agent, or Firm* — McClure, Qualey & Rodack, LLP

(57) ABSTRACT

A method and system for indicating a transmission parameter are provided in the present invention. The method includes: when multi-user multi-input multi-output (MIMO) data are transmitted, using a newly-added indication signaling in a downlink control information format to indicate different joint encoded parameters when numbers of enabled transport blocks are different. Through adding new indication signaling in the present invention, different joint encoded parameters are indicated during the multi-user MIMO data transmission and the MIMO multi-user transmission based on the demodulation reference signal is supported.

18 Claims, 1 Drawing Sheet

(51) Int. Cl.
*H04W 28/18* (2009.01)
*H04W 48/08* (2009.01)
*H04B 7/06* (2006.01)

(56) References Cited

U.S. PATENT DOCUMENTS

| | | | |
|---|---|---|---|
| 2006/0182192 A1* | 8/2006 | Takano | 375/267 |
| 2007/0076784 A1* | 4/2007 | Zhou et al. | 375/141 |
| 2007/0280370 A1* | 12/2007 | Liu | 375/267 |
| 2008/0232494 A1* | 9/2008 | Pan et al. | 375/260 |
| 2008/0260062 A1* | 10/2008 | Imamura | 375/267 |
| 2008/0285512 A1* | 11/2008 | Pan et al. | 370/329 |
| 2009/0046801 A1* | 2/2009 | Pan et al. | 375/267 |
| 2009/0207784 A1* | 8/2009 | Lee et al. | 370/328 |
| 2009/0225737 A1* | 9/2009 | Kim et al. | 370/342 |
| 2009/0262699 A1* | 10/2009 | Wengerter et al. | 370/330 |
| 2010/0023830 A1* | 1/2010 | Wengerter et al. | 714/748 |
| 2010/0027456 A1* | 2/2010 | Onggosanusi et al. | 370/312 |
| 2010/0034314 A1* | 2/2010 | Brown et al. | 375/295 |
| 2010/0035565 A1* | 2/2010 | Baker et al. | 455/101 |
| 2010/0067605 A1* | 3/2010 | Jongren | 375/267 |
| 2010/0074207 A1* | 3/2010 | Pan et al. | 370/329 |
| 2010/0103920 A1* | 4/2010 | Damnjanovic et al. | 370/344 |
| 2010/0116448 A1* | 5/2010 | Healam et al. | 160/370 |
| 2010/0172428 A1* | 7/2010 | Pani et al. | 375/262 |
| 2010/0309870 A1* | 12/2010 | Wengerter et al. | 370/329 |
| 2011/0064159 A1* | 3/2011 | Ko | H04B 7/04 375/267 |
| 2011/0085503 A1* | 4/2011 | Nam et al. | 370/329 |
| 2011/0103324 A1* | 5/2011 | Nam | H04L 5/0048 370/329 |
| 2011/0116530 A1* | 5/2011 | Sambhwani | 375/145 |
| 2011/0194504 A1* | 8/2011 | Gorokhov et al. | 370/329 |
| 2011/0243079 A1* | 10/2011 | Chen | H04B 7/063 370/329 |
| 2011/0268050 A1* | 11/2011 | Farajidana et al. | 370/329 |
| 2012/0033540 A1* | 2/2012 | Kim et al. | 370/203 |
| 2012/0051306 A1* | 3/2012 | Chung et al. | 370/329 |
| 2012/0127950 A1* | 5/2012 | Chung et al. | 370/329 |
| 2012/0170525 A1* | 7/2012 | Sorrentino | 370/329 |
| 2012/0195393 A1* | 8/2012 | Jongren | 375/296 |
| 2012/0213167 A1* | 8/2012 | Xu et al. | 370/329 |
| 2012/0314678 A1* | 12/2012 | Ko et al. | 370/329 |
| 2013/0064190 A1* | 3/2013 | Hariharan et al. | 370/329 |
| 2013/0128849 A1* | 5/2013 | Wengerter et al. | 370/329 |

FOREIGN PATENT DOCUMENTS

| | | |
|---|---|---|
| JP | 2011518489 A | 6/2011 |
| JP | 2011142454 A | 7/2011 |
| WO | 2008041110 A2 | 10/2008 |
| WO | 2009128604 A1 | 10/2009 |
| WO | 2011031019 A2 | 3/2011 |

OTHER PUBLICATIONS

Motorola; "DL Single Cell MU-MIMO: Scrambling Code Design and Signaling Aspects"; 3GPP TSG RAN1 #60 R1-101541 San Francisco, USA Feb. 22-26, 2010; pp. 1-7.

English Abstract translation of JP2011518489 (Published Jun. 23, 2011).

English Abstract translation of JP2011142454 (Published Jul. 21, 2011).

"3rd Generation Partnership Project; Technical Specification Group Radio Access Network; Evolved Universal Terrestrial Radio Access (E-UTRA); Multiplexing and Channel Coding" Release 9; 3GPP TS 36.212 V9.1.0 (Mar. 2010).

* cited by examiner

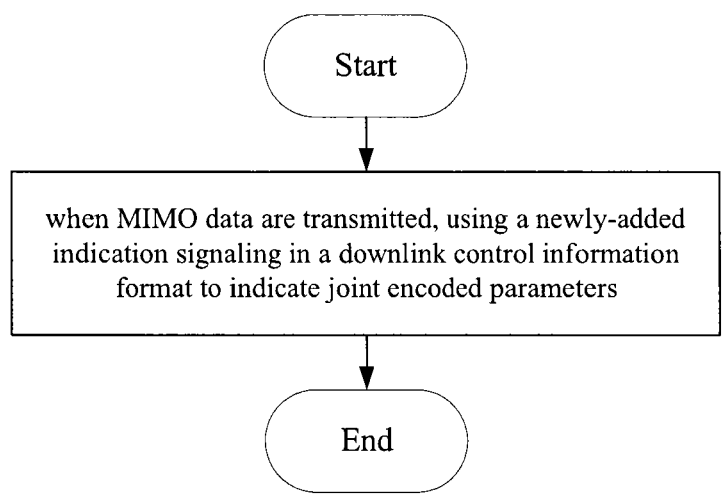

METHOD AND SYSTEM FOR INDICATING TRANSMISSION PARAMETER

CROSS REFERENCE RELATED APPLICATIONS

This application is a national phase of PCT/CN2011/070945 filed Feb. 11, 2011, which claims priority to China Application Serial No. 201010142009.8, filed Apr. 6, 2010, both of which are entirely incorporated herein by reference.

TECHNICAL FIELD

The present invention relates to the wireless communication field, and in particular, to a method and system for indicating transmission parameter.

BACKGROUND OF THE RELATED ART

In the wireless communication technology, when the base station side (for example the evolved node B, that is eNB) transmits data by using a plurality of antennae, the way of the spatial multiplexing can be taken to improve the data transmission rate, that is, the sending end transmits different data in different antenna locations by using the same time-frequency resources, and the receiving end (such as the user equipment, UE) also receives the data by using a plurality of antennae. The resources of all antennae are distributed to the same one user in the case of single user, and that user individually occupies the physical resource assigned by the base station side within one transmission interval, and this transmission way is called as the Single User Multiple-Input Multiple-Output (abbreviated as SU-MIMO); the space resources of different antennae are distributed to different users in the case of multi-user, one user and at least one other user share the physical resource assigned by the base station side within one transmission interval, where the share mode can be a space division multiple access way or space division multiplexing way, and this transmission way is called as the Multiple User Multiple-Input Multiple-Output (abbreviated as MU-MIMO), wherein, the physical resources assigned by the base station side refers to the time-frequency resource. If the transmission system needs to support the SU-MIMO and the MU-MIMO at the same time, then the eNB needs to provide the data under these two modes to the UE. The UE needs to acquire the rank used by the eNB transmitting the MIMO data to the UE no matter in the SU-MIMO mode or the MU-MIMO mode. Under the SU-MIMO mode, the resources of all antennae are distributed to the same one user, the number of the layers used for transmitting the MIMO data equals the rank used by the eNB transmitting the MIMO data; under the MU-MIMO mode, the number of the layers used during the transmission corresponding to one user is less than the total number of the layers used by the eNB transmitting the MIMO data, and if the switch between the SU-MIMO mode and the MU-MIMO is required, then the eNB needs to notify different control data to the UE under different transmission modes.

The standard of the Long-Term Evolution (abbreviated as LTE) release 8 defines the following three kinds of downlink physical control channels: the Physical Control Format Indicator Channel (abbreviated as PCFICH), the Physical Hybrid Automatic Retransmission Request Indicator Channel (abbreviated as PHICH) and the Physical Downlink Control Channel (abbreviated as PDCCH). Wherein, the PDCCH is used for bearing the Downlink Control Information (abbreviated as DCI), including: the uplink and downlink scheduling information, and the uplink power control information. The DCI format is divided into the following kinds: DCI format 0, DCI format 1, DCI format 1A, DCI format 1B, DCI format 1C, DCI format 1D, DCI format 2, DCI format 2A, DCI format 3 and DCI format 3A, etc.; wherein, the transmission mode 5 which supports the MU-MIMO utilizes the downlink control information of the DCI format 1D, and the downlink power offset field $\delta_{power-offset}$ in the DCI format 1D is used to indicate the information of reducing the power of one user by half (that is, $-10 \log 10 (2)$) in the MU-MIMO mode. Since the MU-MIMO transmission mode 5 only supports the MU-MIMO transmission of two users, through this downlink power offset field, the MU-MIMO transmission mode 5 can support the dynamic switch between the SU-MIMO mode and the MU-MIMO mode, however, the DCI format only supports the transmission of one stream for one UE no matter in the SU-MIMO mode or the MU-MIMO mode. Although the LTE Release 8 supports the single user transmission of at most two streams in the transmission mode 4, since the switch between the transmission modes can only be half static, it cannot perform the dynamic switch between the single user multi-stream transmission and the multi-user transmission in LTE release 8.

In the release 9 of the LTE, in order to enhance the downlink multi-antenna transmission, the transmission mode of the dual-stream beamforming is introduced, and the downlink control information is increased with DCI format 2B to support the transmission mode. There is one identification bit of the scrambling identity (abbreviated in as SCID) in the DCI format 2B to support two different scrambling sequences, and the eNB can distribute these two scrambling sequences to different users and multiplex a plurality of users in the same one resource. In addition, when only one transport block is enabled, the new data identification (NDI) bit corresponding to the disabled transport block is also used to indicate the antenna port in the single-layer transmission.

In addition, in the release 10 of the LTE, the transmission mode of the MIMO has already confirmed that the Demodulation Reference Signal (abbreviated as DMRS) is used as the pilot frequency for the demodulation, and the UE needs to obtain the position of the pilot frequency and then can perform the estimation of the channel and the interference on the pilot frequency. The number of the total layers of different transmission has different pilot frequency patterns, for example, three different patterns are preliminarily defined in the release 10 of the LTE. When the number of the total layers of the transmission or the rank is 1 or 2, the first pattern (DMRS pattern 1) is used; when the number of the total layers of the transmission or the rank is 3 or 4, the second pattern (DMRS pattern 2) is used; when the number of the total layers of the transmission or the rank is any value from 5 to 8, the third pattern (DMRS pattern 3) is used. In the SU-MIMO mode, the data in all transmission layers are sent to the same one UE, so the UE can know the pattern of the pilot frequency and can know the pilot frequency position only if it obtains the rank. In the MU-MIMO mode, the UE needs to acquire the rank and the number of the layers starting to perform the transmission to the UE, and the UE also needs to acquire the pilot frequency pattern for transmission then it can only obtain the pilot frequency position. In addition, different DMRS ports use different spreading codes, and the UE further needs to acquire the spreading code used for transmission and then can only obtain the information on the pilot frequency. In the technology of the existing LTE release number 10, the above-mentioned demand is not supported. In the LTE release 10, it is already confirmed that the transmission mode of the MIMO is required to support single user transmission of which the maximum number of the total layers is 8, and support the single user and multi-user transmission in the same one transmission mode, however, signaling of the MIMO multi-user transmission based on the DMRS has not been supported yet.

SUMMARY OF THE INVENTION

The technical problem that the present invention requires to solve is to provide a method and system for indicating a transmission parameter, which supports the MIMO multi-user transmission based on the demodulation reference signal.

In order to solve the above-mentioned technical problem, the present invention provides a method for indicating a transmission parameter, comprising: when multi-user multi-input multi-output (MIMO) data are transmitted, using a newly-added indication signaling in a downlink control information format to indicate different joint encoded parameters when numbers of enabled transport blocks are different.

The above-mentioned method further has the following characteristics:

the step of using a newly-added indication signaling in a downlink control information format to indicate different joint encoded parameters when numbers of enabled transport blocks are different comprises: when a single transport block is enabled, indicating to perform joint encoding on one or more information in the following information: whether diversity is transmitted, a number of transmitted layers, scrambling identity, antenna port, spreading code information, and reference signal information.

The above-mentioned method further has the following characteristics:

the step of using a newly-added indication signaling in a downlink control information format to indicate different joint encoded parameters when numbers of enabled transport blocks are different comprises: when two transport blocks are enabled, indicating to perform the joint encoding on one or more information in the following information: a number of transmitted layers, scrambling identity, antenna port, spreading code information, and reference signal information.

The above-mentioned method further has the following characteristics:

the joint encoded parameters indicated by the indication signaling are different when the total number of the antenna ports is different or receiver capability of user equipment is different.

The above-mentioned method further has the following characteristics: when the single transport block is enabled, when value of the indication signaling is different, the antenna port for single layer transmission indicated by an indication bit of new data corresponding to disabled transport block is different; or the antenna port for the single layer transmission indicated by the indication bit of the new data corresponding to the disabled transport block is the antenna port with even index or the antenna port with odd index; or the indication bit of the new data corresponding to the disabled transport block indicates the scrambling identity.

In order to solve the above-mentioned technical problem, the present invention further provides a system for indicating a transmission parameter, comprising an evolved node B, wherein, the evolved node B comprises a multiple user multi-input multi-output (MIMO) data downlink transmission module, and the MIMO data downlink transmission module is configured to: when MIMO data are transmitted, use a newly-added indication signaling in a downlink control information format to indicate different joint encoded parameters when numbers of enabled transport blocks are different.

The above-mentioned system further has the following characteristics:

the MIMO data downlink transmission module is configured to: when a single transport block is enabled, indicate to perform joint encoding on one or more information in the following information: whether diversity is transmitted, a number of transmitted layers, scrambling identity, antenna port, spreading code information, and reference signal information.

The above-mentioned system further has the following characteristics:

the MIMO data downlink transmission module is configured to: when two transport blocks are enabled, indicate to perform the joint encoding on one or more information in the following information: a number of transmitted layers, scrambling identity, antenna port, spreading code information, and reference signal information.

The above-mentioned system further has the following characteristics:

the MIMO data downlink transmission module is further configured to: use the indication signaling to indicate performing the joint encoding by using different information when the total number of the antenna ports is different or receiver capability of user equipment is different.

The above-mentioned system further has the following characteristics:

through different values of the indication signaling, make the antenna port for single layer transmission indicated by an indication bit of new data corresponding to disabled transport block be different; or use the indication bit of the new data corresponding to the disabled transport block to indicate the antenna port for the single layer transmission to be the antenna ports of which all serial numbers are even or the antenna ports of which all serial numbers are odd; or use the indication bit of the new data corresponding to the disabled transport block to indicate the scrambling identity.

Through adding new indication signaling, the present invention indicates different joint encoded parameters when the data are transmitted under the multi-user MIMO and supports the MIMO multi-user transmission based on the demodulation reference signal.

BRIEF DESCRIPTION OF DRAWINGS

FIG. 1 is a diagram of a method for indicating a transmission parameter in an embodiment.

PREFERRED EMBODIMENTS OF THE PRESENT INVENTION

The present invention provides one kind of downlink control information with low overhead, which supports the single user and multi-user transmission for which the maximum of the total number of the layers is 8 in the same one signaling at the same time. Considering the problem that the release number 10 of the LTE in the related technology does not support the MIMO multi-user transmission based on the demodulation reference signal, the embodiment of the present invention provides a method and system for indicating the transmission parameter, which realize to support the MIMO multi-user transmission based on the demodulation reference signal, by adding a new indication signaling, which is used to indicate different joint encoded parameters when the number of the enabled transport blocks is different, in the downlink control information format, thereby.

The system for indicating a transmission parameter in the present invention comprises an evolved node B, wherein, the evolved node B comprises a multi-user multi-input multi-output (MIMO) data downlink transmission module, which is configured to: when the MIMO downlink data are transmitted, use a newly-added indication signaling in a downlink control information format to indicate different joint encoded parameters when the number of enabled transport blocks is different.

The MIMO data downlink transmission module is further configured to: when a single transport block is enabled, indicating to perform joint encoding on one or more information in the following information: whether diversity is transmitted, a number of transmitted layers, scrambling identity, antenna port, spreading code information, and pilot frequency information; when two transport blocks are enabled, indicating to perform the joint encoding on one or more information in the following information: a number of transmitted layers, scrambling identity, antenna port, spreading code information, and pilot frequency information; and further configured to use the indication signaling to indicate that information used for performing the joint encoding is different when the total number of the antenna ports is different or receiver capability of user equipment is different; further configured to, when the single transport block is enabled, make the antenna port for single layer transmission indicated by an indication bit of new data corresponding to disabled transport block be different through different values of the indication signaling; further configured to, when the single transport block is enabled, use the indication bit of the new data corresponding to the disabled transport block to indicate the antenna port for the single layer transmission to be the antenna ports of which all serial numbers are even or the antenna ports of which all serial numbers are odd; and further configured to, when the single transport block is enabled, use the indication bit of the new data corresponding to the disabled transport block to indicate the scrambling identity.

As shown in FIG. 1, the method for indicating a transmission parameter comprises: when data are transmitted under multiple user multi-input multi-output (MIMO), using a newly-added indication signaling in a downlink control information format to indicate different joint encoded parameters when numbers of enabled transport blocks are different. When a single transport block is enabled, it is indicated to perform joint encoding on one or more information in the following information: whether diversity is transmitted, a number of transmitted layers, scrambling identity, antenna port, spreading code information, and pilot frequency information. When two transport blocks are enabled, it is indicated to perform the joint encoding on one or more information in the following information: a number of transmitted layers, scrambling identity, antenna port, spreading code information, and pilot frequency information. When the total number of the antenna ports is different, the information used when performing the joint encoding is different. For example, the parameter used when the joint encoding design is performed in the case of four antenna ports is different with the parameter used when the joint encoding design is performed in the case of eight antenna ports. When the receiver capability of user equipment is different, the parameter used when performing the joint encoding also can be different, for example, the parameter used when the joint encoding design is performed in the case that the receiver capability of the UE is four layers is different with the parameter used when the joint encoding design is performed in the case that the receiver capability of the UE is eight layers.

When the single transport block is enabled, the antenna port for the single layer transmission indicated by an indication bit of the new data corresponding to disabled transport block is different; or the antenna port for the single layer transmission indicated by using the indication bit of the new data corresponding to the disabled transport block is the antenna port with even index or the antenna port with odd index; or when the single transport block is enabled, the indication bit of the new data corresponding to the disabled transport block is used to indicate the scrambling identity.

In the above-mentioned method and system of the present invention, the reference signal information can include the reference signal pattern and/or the reference signal mode. The reference signal pattern and the reference signal mode are equivalent, and the reference signal pattern is corresponding to the unique reference signal mode, while the reference signal pattern can be confirmed through the corresponding reference signal mode. When the joint encoded parameter is indicated, the reference signal pattern or the reference signal mode or the reference signal information can be indicated directly. The number of the transmitted layers and the transmitted rank value are equivalent, and the rank values during the multi-user and the single user transmission represent the number of the layers performing the transmission to the UE; the antenna port and the index of the layer can be one-to-one correspondence through the mapping way, and the index of the layer can be known through the antenna port used during the multi-user and the single user transmission; the above-mentioned equivalent information also can be obtained through the signaling by the embodiment of the present invention.

In the above-mentioned method and system of the present invention, the information of the spreading code includes the length of the spreading code and the specific spreading code. In the present embodiment, when the joint encoded parameter is indicated, the length of the spreading code can be indicated directly, and also the spreading code can be indicated directly, and also the label of the spreading code information can be indicated so that the length of the spreading code included in the spreading code information and the specific spreading code information can be indicated.

As shown in the following table.

| | Spreading code information |
|---|---|
| 1 | The length of the spreading code = 2, and the optional spreading code includes spreading Codeword 1 and spreading code 2 |
| 2 | The length of the spreading code = 4, and the optional spreading code includes spreading code 3, spreading code 4, spreading code 5, and spreading code 6 |

The present invention is further described in detail combining the embodiment hereinafter.

It needs to illustrated that various corresponding relations in the embodiment of the present invention (such as the corresponding relation of the index after the joint encoding and the specific attribute in the table, the corresponding relation of the antenna port and the number of the layers, the corresponding relation of the index of the layers and the reference signal pattern) are not limited to the unique corresponding relation, that is, their consequences can be exchanged and combined at will, and only need to be one-to-one correspondence. Particularly, one index after the joint encoding is corresponding to the unique specific attribute, and one specific attribute is corresponding to the unique index after the unique joint encoding. The embodiment of the present invention only lists one possible corresponding relation thereof, and so long as the state of the specific attribute is unanimous, it is included within the protection scope of the present invention.

Embodiment 1

In embodiment 1, when a single transport block is enabled, the joint encoding is performed on one or more information in the following information through the indication of the indication signaling: Transmit diversity, the number of transmitted layers, the scrambling identity and the antenna port. When two transport blocks are enabled, the joint encoding is performed on one or more information in the following information through the indication of the indication signaling: the number of transmitted layers, the scrambling identity and the antenna port. In the following table, when four antenna ports are used or when the UE has the receiver capability of four layers, the indication signaling includes bits 1 and 2, used for indicating various information; when eight antenna ports are used or when the UE has the receiver capability of eight layers, the indication signaling includes bits 1, 2 and 3, used for indicating various information.

The information used when the joint encoding is performed indicated by the indication signaling is different when the total number of the antenna ports is different or the receiver capability of the user equipment is different.

When only one transport block is enabled, the new data indicator (NDI) bit corresponding to the disabled transport block is used to indicate the antenna port for the single layer transmission, and when the value of the indication signaling is different, the antenna port for the single layer transmission indicated by the NDI bit corresponding to the disabled transport block is different.

One case of the specific indication in the application is provided in the following table.

| The joint encoding design when four antenna ports are used or when the UE has the receiver capability of four layers | |
|---|---|
| Signaling bits 1 and 2 | Signaling |
| | One codeword: Codeword 0, enabled Codeword 1, disabled |
| 0 | Transmit diversity |
| 1 | 1 Layer, antenna port 7 or 8 SCID = 0 |
| 2 | 1 Layer, antenna port 7 or 8 SCID = 1 |
| 3 | 2 Layers, antenna ports 7, 8 |
| | Two codewords: Codeword 0, enabled Codeword 1, enabled |
| 0 | 2 Layers, antenna ports 7, 8, SCID = 0 |
| 1 | 2 Layers, antenna ports 7, 8, SCID = 1 |
| 2 | 3 Layers, antenna ports 7, 8, 9 |
| 3 | 4 Layers, antenna ports 7, 8, 9, 10 |

| The joint encoding design when eight antenna ports are used or when the UE has the receiver capability of eight layers | |
|---|---|
| Signaling bits 1-3 | Signaling |
| | One codeword: Codeword 0, enabled Codeword 1, disabled |
| 0 | Transmit diversity |
| 1 | 1 Layer, antenna port 7 or 8 SCID = 0 |
| 2 | 1 Layer, antenna port 7 or 8 SCID = 1 |
| 3 | 2 Layers, antenna ports 7, 8 |
| 4 | 3 Layers, antenna ports 7, 8, 9 |
| 5 | 4 Layers, antenna ports 7, 8, 9, 10 |
| 6 | Preserved |
| 7 | Preserved |
| | Two codewords: Codeword 0, enabled Codeword 1, enabled |
| 0 | 2 Layers, antenna ports 7, 8, SCID = 0 |
| 1 | 2 Layers, antenna ports 7, 8, SCID = 1 |
| 2 | 3 Layers, antenna ports 7 to 9 |
| 3 | 4 Layers, antenna ports 7 to 10 |
| 4 | 5 Layers, antenna ports 7 to 11 |
| 5 | 6 Layers, antenna ports 7 to 12 |
| 6 | 7 Layers, antenna ports 7 to 13 |
| 7 | 8 Layers, antenna ports 7 to 14 |

| The new data indicator corresponding to the disabled transport block when only 1 layer is transmitted | |
|---|---|
| The new data indicator corresponding to the disabled transport block | Antenna port |
| 0 | 7 |
| 1 | 8 |

Embodiment 2

In embodiment 2, corresponding to that one single transport block is enabled, the joint encoding is performed on one or more information in the following information through the indication of the indication signaling: Transmit diversity, the number of transmitted layers and the antenna port. When two transport blocks are enabled, the joint encoding is performed on one or more information in the following information through the indication of the indication signaling: the number of transmitted layers and the antenna port. In the following table, when four antenna ports are used or when the UE has the receiver capability of four layers, the indication signaling includes bits 1 and 2, used for indicating various information; when eight antenna ports are used or when the UE has the receiver capability of eight layers, the indication signaling includes bits 1, 2 and 3, used for indicating various information.

The information used when the joint encoding is performed indicated by the indication signaling is different when the total number of the antenna ports is different or the receiver capability of the user equipment is different.

When only one transport block is enabled, the new data indicator (NDI) bit corresponding to the disabled transport block is used to indicate the antenna port for the single layer transmission, and when the value of the indication signaling is different, the antenna port for the single layer transmission indicated by the new data indicator bit corresponding to the disabled transport block is different.

One case of the specific indication in the application is provided in the following table.

| The joint encoding design when four antenna ports are used or when the UE has the receiver capability of four layers | |
|---|---|
| Signaling bits 1 and 2 | Signaling |
| | One codeword: Codeword 0, enabled Codeword 1, disabled |
| 0 | Transmit diversity |
| 1 | 1 Layer, antenna port 7 or 8 |
| 2 | 2 Layers, antenna port 7 or 8 |
| 3 | Preserved |
| | Two codewords: Codeword 0, enabled Codeword 1, enabled |
| 0 | 2 Layers, antenna ports 7, 8, |
| 1 | 3 Layers, antenna ports 7 to 9 |
| 2 | 4 Layers, antenna ports 7 to 10 |
| 3 | Preserved |

| The joint encoding design when eight antenna ports are used or when the UE has the receiver capability of eight layers | |
|---|---|
| Signaling bits 1-3 | Signaling |
| | One codeword: Codeword 0, enabled Codeword 1, disabled |
| 0 | Transmit diversity |
| 1 | 1 Layer, antenna port 7 or 8 |
| 2 | 2 Layers, antenna ports 7, 8 |
| 3 | 3 Layers, antenna ports 7, 8, 9 |
| 4 | 4 Layers, antenna ports 7 to 10 |
| 5 | Preserved |
| 6 | Preserved |
| 7 | Preserved |
| | Two codewords: Codeword 0, enabled Codeword 1, enabled |
| 0 | 2 Layers, antenna ports 7, 8 |
| 1 | 3 Layers, antenna ports 7, 8, 9 |
| 2 | 4 Layers, antenna ports 7 to 10 |
| 3 | 5 Layers, antenna ports 7 to 11 |
| 4 | 6 Layers, antenna ports 7 to 12 |
| 5 | 7 Layers, antenna ports 7 to 13 |
| 6 | 8 Layers, antenna ports 7 to 14 |
| 7 | Preserved |

| The new data indicator corresponding to the disabled transport block when only 1 layer is transmitted | |
|---|---|
| The new data indicator corresponding to the disabled transport block | Antenna port |
| 0 | 7 |
| 1 | 8 |

Embodiment 3

In embodiment 3, when one single transport block is enabled correspondingly, the joint encoding is performed on one or more information in the following information through the indication of the indication signaling: Transmit diversity, the number of transmitted layers, the scrambling identity, the antenna port and the reference signal pattern. When two transport blocks are enabled, the joint encoding is performed on one or more information in the following information through the indication of the indication signaling: the number of transmitted layers, the scrambling identity, the antenna port and the reference signal pattern. In the following table, when four antenna ports are used or when the UE has the receiver capability of four layers, the indication signaling includes bits 1, 2 and 3, used for indicating various information; when eight antenna ports are used or when the UE has the receiver capability of eight layers, the indication signaling includes bits 1, 2, 3 and 4, used for indicating various information.

The information used when the joint encoding is performed indicated by the indication signaling is different when the total number of the antenna ports is different or the receiver capability of the user equipment is different.

When the single transport block is enabled, if the value of the indication signaling is different, the antenna port for single layer transmission indicated by an new data indicator bit corresponding to disabled transport block is different; or the antenna port for the single layer transmission indicated by the used new data indicator bit corresponding to the disabled transport block are the antenna ports of which all serial numbers are even or the antenna port of which all serial numbers are odd.

One case of the specific indication in the application is provided in the following table.

| The joint encoding design when four antenna ports are used or when the UE has the receiver capability of four layers | |
|---|---|
| Signaling bits 1-3 | Signaling |
| | One codeword: Codeword 0, enabled Codeword 1, disabled |
| 0 | Transmit diversity |
| 1 | 1 Layer, antenna port 7 or 8 SCID = 0, reference signal pattern 1 |
| 2 | 1 Layer, antenna port 7 or 8 SCID = 1, reference signal pattern 1 |
| 3 | 1 Layer, antenna port 7 or 8, reference signal pattern 2 |
| 4 | 1 Layer, antenna port 9 or 10, reference signal pattern 2 |
| 5 | 2 Layers, antenna ports 7, 8, reference signal pattern 1 |
| 6 | Preserved |

| The joint encoding design when four antenna ports are used or when the UE has the receiver capability of four layers | |
|---|---|
| Signaling bits 1-3 | Signaling |
| 7 | Preserved |
| | Two codewords: |
| | Codeword 0, enabled |
| | Codeword 1, enabled |
| 0 | 2 Layers, antenna ports 7, 8, SCID = 0, reference signal pattern 1 |
| 1 | 2 Layers, antenna ports 7, 8, SCID = 1, reference signal pattern 1 |
| 2 | 2 Layers, antenna ports 7, 8, reference signal pattern 2 |
| 3 | 2 Layers, antenna ports 9, 10, reference signal pattern 2 |
| 4 | 3 Layers, antenna ports 7, 8, 9, reference signal pattern 2 |
| 5 | 4 Layers, antenna ports 7 to 10, reference signal pattern 2 |
| 6 | Preserved |
| 7 | Preserved |

| The joint encoding design when eight antenna ports are used or when the UE has the receiver capability of eight layers | |
|---|---|
| Signaling bits 1-4 | Signaling |
| | One codeword: |
| | Codeword 0, enabled |
| | Codeword 1, disabled |
| 0 | Transmit diversity |
| 1 | 1 Layer, antenna port 7 or 8 SCID = 0, reference signal pattern 1 |
| 2 | 1 Layer, antenna port 7 or 8 SCID = 1, reference signal pattern 1 |
| 3 | 1 Layer, antenna port 7 or 8, reference signal pattern 2 |
| 4 | 1 Layer, antenna port 9 or 10, reference signal pattern 2 |
| 5 | 2 Layers, antenna ports 7, 8, reference signal pattern 1 |
| 6 | 3 Layers, antenna ports 7, 8, 9, reference signal pattern 2 |
| 7 | 4 Layers, antenna ports 7 to 10, reference signal pattern 2 |
| 8 | Preserved |
| 9 | Preserved |
| 10-15 | Preserved |
| | Two codewords: |
| | Codeword 0, enabled |
| | Codeword 1, enabled |
| 0 | 2 Layers, antenna ports 7, 8, SCID = 0, reference signal pattern 1 |
| 1 | 2 Layers, antenna ports 7, 8, SCID = 1, reference signal pattern 1 |
| 2 | 2 Layers, antenna ports 7, 8, reference signal pattern 2 |
| 3 | 2 Layers, antenna ports 9, 10, reference signal pattern 2 |
| 4 | 3 Layers, antenna ports 7, 8, 9, reference signal pattern 2 |
| 5 | 4 Layers, antenna ports 7 to 10, reference signal pattern 2 |

| The joint encoding design when eight antenna ports are used or when the UE has the receiver capability of eight layers | |
|---|---|
| Signaling bits 1-4 | Signaling |
| 6 | 5 Layers, antenna ports 7 to 11 reference signal pattern 3 |
| 7 | 6 Layers, antenna ports 7 to 12 reference signal pattern 3 |
| 8 | 7 Layers, antenna ports 7 to 13 reference signal pattern 3 |
| 9 | 8 Layers, antenna ports 7 to 14 reference signal pattern 3 |
| 10-15 | Preserved |

| The new data indicator corresponding to the disabled transport block when only 1 layer is transmitted | | |
|---|---|---|
| The new data indicator corresponding to the disabled transport block | Antenna port (when signaling = 1, 2, 3) | Antenna port (when signaling = 4) |
| 0 | 7 | 9 |
| 1 | 8 | 10 | or

| The new data indicator corresponding to the disabled transport block when only 1 layer is transmitted | |
|---|---|
| The new data indicator corresponding to the disabled transport block | Antenna port |
| 0 | Odd antenna port |
| 1 | Even antenna port |

Embodiment 4

In embodiment 4, when a single transport block is enabled, the joint encoding is performed on one or more information in the following information through the indication of the indication signaling: Transmit diversity, the number of transmitted layers, the scrambling identity, the antenna port and the reference signal pattern. When two transport blocks are enabled, the joint encoding is performed on one or more information in the following information through the indication of the indication signaling: the number of transmitted layers, the scrambling identity, the antenna port and the reference signal pattern. In the following table, when four antenna ports are used or when the UE has the receiver capability of four layers, the indication signaling includes bit 1, 2 and 3, used for indicating various information; when eight antenna ports are used or when the UE has the receiver capability of eight layers, the indication signaling includes bit 1, 2, 3 and 4, used for indicating various information.

The information used when the joint encoding is performed indicated by the indication signaling is different when the total number of the antenna ports is different or the receiver capability of the user equipment is different.

When the single transport block is enabled, and the value of the indication signaling is different, the antenna port for single layer transmission indicated by a new data indicator bit corresponding to disabled transport block is different.

One case of the specific indication in the application is provided in the following table.

| The joint encoding design when four antenna ports are used or when the UE has the receiver capability of four layers | |
|---|---|
| Signaling bits 1-3 | Signaling |
| One codeword: Codeword 0, enabled Codeword 1, disabled | |
| 0 | Transmit diversity |
| 1 | 1 Layer, antenna port 7 or 8 SCID = 0 |
| 2 | 1 Layer, antenna port 7 or 8 SCID = 1 |
| 3 | 1 Layer, antenna port 7 or 8, reference signal pattern 2 |
| 4 | 1 Layer, antenna port 9, reference signal pattern 2 |
| 5 | 1 Layer, antenna port 10, reference signal pattern 2 |
| 6 | 2 Layers, antenna ports 7, 8, reference signal pattern 2 |
| 7 | Preserved |
| Two codewords: Codeword 0, enabled Codeword 1, enabled | |
| 0 | 2 Layers, antenna ports 7, 8, SCID = 0, reference signal pattern 1 |
| 1 | 2 Layers, antenna ports 7, 8, SCID = 1, reference signal pattern 1 |
| 2 | 2 Layers, antenna ports 7, 8, reference signal pattern 2 |
| 3 | 2 Layers, antenna ports 9, 10, reference signal pattern 2 |
| 4 | 3 Layers, antenna ports 7, 8, 9, reference signal pattern 2 |
| 5 | 4 Layers, antenna ports 7 to 10, reference signal pattern 2 |
| 6 | Preserved |
| 7 | Preserved |

| The joint encoding design when eight antenna ports are used or when the UE has the receiver capability of eight layers | |
|---|---|
| Signaling bits 1-4 | Signaling |
| One codeword: Codeword 0, enabled Codeword 1, disabled | |
| 0 | Transmit diversity |
| 1 | 1 Layer, antenna port 7 or 8 SCID = 0, reference signal pattern 1 |
| 2 | 1 Layer, antenna port 7 or 8 SCID = 1, reference signal pattern 1 |
| 3 | 1 Layer, antenna port 7 or 8, reference signal pattern 2 |
| 4 | 1 Layer, antenna port 9, reference signal pattern 2 |
| 5 | 1 Layer, antenna port 10, reference signal pattern 2 |
| 6 | 2 Layers, antenna ports 7, 8, reference signal pattern 2 |
| 7 | 3 Layers, antenna ports 7, 8, 9, reference signal pattern 2 |
| 8 | 4 Layers, antenna ports 7 to 10, reference signal pattern 2 |
| 9 | Preserved |
| 10-15 | Preserved |
| Two codewords: Codeword 0, enabled Codeword 1, enabled | |
| 0 | 2 Layers, antenna ports 7, 8, SCID = 0, reference signal pattern 1 |
| 1 | 2 Layers, antenna ports 7, 8, SCID = 1, reference signal pattern 1 |
| 2 | 2 Layers, antenna ports 7, 8, reference signal pattern 2 |
| 3 | 2 Layers, antenna ports 9, 10, reference signal pattern 2 |
| 4 | 3 Layers, antenna ports 7, 8, 9, reference signal pattern 2 |
| 5 | 4 Layers, antenna ports 7 to 10, reference signal pattern 2 |
| 6 | 5 Layers, antenna ports 7 to 11 reference signal pattern 3 |
| 7 | 6 Layers, antenna ports 7 to 12 reference signal pattern 3 |
| 8 | 7 Layers, antenna ports 7 to 13 reference signal pattern 3 |
| 9 | 8 Layers, antenna ports 7 to 14 reference signal pattern 3 |
| 10-15 | Preserved |

| The new data indicator corresponding to the disabled transport block when only 1 layer is transmitted | |
|---|---|
| The new data indicator corresponding to the disabled transport block | Antenna port (when the signaling = 1, 2, 3) |
| 0 | 7 |
| 1 | 8 |

Embodiment 5

In embodiment 5, when one single transport block is enabled, the joint encoding is performed on one or more information in the following information through the indication of the indication signaling: Transmit diversity, the number of transmitted layers, the scrambling identity, the antenna port and the length of the spreading code. When two transport blocks are enabled, the joint encoding is performed on one or more information in the following information through the indication of the indication signaling: the number of transmitted layers, the scrambling identity, the antenna port and the length of the spreading code. In the following table, when four antenna ports are used or when the UE has the receiver capability of four layers, the indication signaling includes bit 1, 2 and 3, used for indicating various information; when eight antenna ports are used or when the UE has the receiver capability of eight layers, the indication signaling includes bit 1, 2, 3 and 4, used for indicating various information.

The information used when the joint encoding is performed indicated by the indication signaling is different when the total number of the antenna ports is different or the receiver capability of the user equipment is different.

When the single transport block is enabled, and the value of the indication signaling is different, the antenna port for single layer transmission indicated by a new data indicator bit corresponding to disabled transport block is different.

One case of the specific indication in the application is provided in the following table.

| The joint encoding design when four antenna ports are used or when the UE has the receiver capability of four layers | |
|---|---|
| Signaling bits 1-3 | Signaling |
| One codeword: Codeword 0, enabled Codeword 1, disabled | |
| 0 | Transmit diversity |
| 1 | 1 Layer, antenna port 7 or 8 SCID = 0, the length of the spreading code = 2 |
| 2 | 1 Layer, antenna port 7 or 8 SCID = 1, the length of the spreading code = 2 |
| 3 | 1 Layer, antenna port 7 or 8, the length of the spreading code = 4 |
| 4 | 1 Layer, antenna port 9 or 10, the length of the spreading code = 4 |
| 5 | 2 Layers, antenna ports 7, 8, the length of the spreading code = 2 |
| 6 | Preserved |
| 7 | Preserved |
| Two codewords: Codeword 0, enabled Codeword 1, enabled | |
| 0 | 2 Layers, antenna ports 7, 8, SCID = 0, the length of the spreading code = 2 |
| 1 | 2 Layers, antenna ports 7, 8, SCID = 1, the length of the spreading code = 2 |
| 2 | 2 Layers, antenna ports 7, 8, the length of the spreading code = 4 |
| 3 | 2 Layers, antenna ports 9, 10, the length of the spreading code = 4 |
| 4 | 3 Layers, antenna ports 7, 8, 9, the length of the spreading code = 2 |
| 5 | 4 Layers, antenna ports 7 to 10, the length of the spreading code = 2 |
| 6 | Preserved |
| 7 | Preserved |

| The joint encoding design when eight antenna ports are used or when the UE has the receiver capability of eight layers | |
|---|---|
| Signaling bits 1-4 | Signaling |
| One codeword: Codeword 0, enabled Codeword 1, disabled | |
| 0 | Transmit diversity |
| 1 | 1 Layer, antenna port 7 or 8 SCID = 0, the length of the spreading code = 2 |
| 2 | 1 Layer, antenna port 7 or 8 SCID = 1, the length of the spreading code = 2 |
| 3 | 1 Layer, antenna port 7 or 8, the length of the spreading code = 4 |
| 4 | 1 Layer, antenna port 9 or 10, the length of the spreading code = 4 |
| 5 | 2 Layers, antenna ports 7, 8, the length of the spreading code = 2 |
| 6 | 3 Layers, antenna ports 7, 8, 9, the length of the spreading code = 2 |
| 7 | 4 Layers, antenna ports 7 to 10, the length of the spreading code = 2 |
| 8 | Preserved |
| 9 | Preserved |
| 10-15 | Preserved |
| Two codewords: Codeword 0, enabled Codeword 1, enabled | |
| 0 | 2 Layers, antenna ports 7, 8, SCID = 0, the length of the spreading code = 2 |
| 1 | 2 Layers, antenna ports 7, 8, SCID = 1, the length of the spreading code = 2 |
| 2 | 2 Layers, antenna ports 7, 8, the length of the spreading code = 4 |
| 3 | 2 Layers, antenna ports 9, 10, the length of the spreading code = 4 |
| 4 | 3 Layers, antenna ports 7, 8, 9, the length of the spreading code = 2 |
| 5 | 4 Layers, antenna ports 7 to 10, the length of the spreading code = 2 |
| 6 | 5 Layers, antenna ports 7 to 11 the length of the spreading code = 4 |
| 7 | 6 Layers, antenna ports 7 to 12 the length of the spreading code = 4 |
| 8 | 7 Layers, antenna ports 7 to 13 the length of the spreading code = 4 |
| 9 | 8 Layers, antenna ports 7 to 14 the length of the spreading code = 4 |
| 10-15 | Preserved |

| The new data indicator corresponding to the disabled transport block when only 1 layer is transmitted | | |
|---|---|---|
| The new data indicator corresponding to the disabled transport block | Antenna port (when signaling = 1, 2, 3) | Antenna port (when signaling = 4) |
| 0 | 7 | 9 |
| 1 | 8 | 10 |

Embodiment 6

In embodiment 6, when one single transport block is enabled, the joint encoding is performed on one or more information in the following information through the indication of the indication signaling: the number of transmitted layers, the antenna port and the length of the spreading code. When two transport blocks are enabled, the joint encoding is performed on one or more information in the following information through the indication of the indication signaling: the number of transmitted layers, the scrambling identity, the antenna port and the length of the spreading code. In the following table, when four antenna ports are used or when the UE has the receiver capability of four layers, the indication signaling includes bits 1, 2 and 3, used for indicating various information; when eight antenna ports are used or when the UE has the receiver capability of eight layers, the indication signaling includes bits 1, 2, 3 and 4, used for indicating various information.

The information used when the joint encoding is performed indicated by the indication signaling is different when the total number of the antenna ports is different or the receiver capability of the user equipment is different.

When the single transport block is enabled, the scrambling identity is indicated by using the new data indicator bit corresponding to the disabled transport block. And especially, it is applied for the case that the indication signaling does not indicate the scrambling identity.

One case of the specific indication in the application is provided in the following table.

| The joint encoding design when four antenna ports are used or when the UE has the receiver capability of four layers | |
|---|---|
| Signaling bits 1-3 | Signaling |
| | One codeword: Codeword 0, enabled Codeword 1, disabled |
| 0 | 1 Layer, antenna port 7 the length of the spreading code = 2 |
| 1 | 1 Layer, antenna port 8 the length of the spreading code = 2 |
| 2 | 1 Layer, antenna port 7 the length of the spreading code = 4 |
| 3 | 1 Layer, antenna port 8, the length of the spreading code = 4 |
| 4 | 1 Layer, antenna port 9, the length of the spreading code = 4 |
| 5 | 1 Layer, antenna port 10, the length of the spreading code = 4 |
| 6 | 2 Layers, antenna ports 7, 8, the length of the spreading code = 2 |
| 7 | Transmit diversity |
| | Two codewords: Codeword 0, enabled Codeword 1, enabled |
| 0 | 2 Layers, antenna ports 7, 8, SCID = 0, the length of the spreading code = 2 |
| 1 | 2 Layers, antenna ports 7, 8, SCID = 1, the length of the spreading code = 2 |
| 2 | 2 Layers, antenna ports 7, 8, the length of the spreading code = 4 |
| 3 | 2 Layers, antenna ports 9, 10, the length of the spreading code = 4 |
| 4 | 3 Layers, antenna ports 7, 8, 9, the length of the spreading code = 2 |
| 5 | 4 Layers, antenna ports 7 to 10, the length of the spreading code = 2 |
| 6 | Preserved |
| 7 | Preserved |

| The joint encoding design when eight antenna ports are used or when the UE has the receiver capability of eight layers | |
|---|---|
| Signaling bits 1-4 | Signaling |
| | One codeword: Codeword 0, enabled Codeword 1, disabled |
| 0 | 1 Layer, antenna port 7 the length of the spreading code = 2 |
| 1 | 1 Layer, antenna port 8 the length of the spreading code = 2 |
| 2 | 1 Layer, antenna port 7 the length of the spreading code = 4 |
| 3 | 1 Layer, antenna port 8, the length of the spreading code = 4 |
| 4 | 1 Layer, antenna port 9, the length of the spreading code = 4 |
| 5 | 1 Layer, antenna port 10, the length of the spreading code = 4 |
| 6 | 2 Layers, antenna ports 7, 8, the length of the spreading code = 2 |
| 7 | 3 Layers, antenna ports 7, 8, 9, the length of the spreading code = 2 |
| 8 | 4 Layers, antenna ports 7 to 10, the length of the spreading code = 2 |
| 9 | Transmit diversity |
| 10-15 | Preserved |
| | Two codewords: Codeword 0, enabled Codeword 1, enabled |
| 0 | 2 Layers, antenna ports 7, 8, SCID = 0, the length of the spreading code = 2 |
| 1 | 2 Layers, antenna ports 7, 8, SCID = 1, the length of the spreading code = 2 |
| 2 | 2 Layers, antenna ports 7, 8, the length of the spreading code = 4 |
| 3 | 2 Layers, antenna ports 9, 10, the length of the spreading code = 4 |
| 4 | 3 Layers, antenna ports 7, 8, 9, the length of the spreading code = 2 |
| 5 | 4 Layers, antenna ports 7 to 10, the length of the spreading |

| The joint encoding design when eight antenna ports are used or when the UE has the receiver capability of eight layers | |
| --- | --- |
| Signaling bits 1-4 | Signaling |
| 6 | code = 2<br>5 Layers, antenna ports 7 to 11<br>the length of the spreading<br>code = 4 |
| 7 | 6 Layers, antenna ports 7 to 12<br>the length of the spreading<br>code = 4 |
| 8 | 7 Layers, antenna ports 7 to 13<br>the length of the spreading<br>code = 4 |
| 9 | 8 Layers, antenna ports 7-14<br>the length of the spreading<br>code = 4 |
| 10-15 | Preserved |

| The new data indicator corresponding to the disabled transport block when only 1 layer is transmitted | |
| --- | --- |
| The new data indicator corresponding to the disabled transport block | the scrambling identity |
| 0 | 0 |
| 1 | 1 |

Embodiment 7

In embodiment 7, when one single transport block is enabled, the joint encoding is performed on one or more information in the following information through the indication of the indication signaling: the number of transmitted layers, the scrambling identity and the antenna port. When two transport blocks are enabled, the joint encoding is performed on one or more information in the following information through the indication of the indication signaling: the number of transmitted layers, the scrambling identity, and the antenna port. In the following table, the uniform signaling is used to support the transmission for the maximum of eight antenna ports, that is, no matter how many antenna ports there are, this uniform signaling table is used, and the indication signaling includes bits 1, 2 and 3, used for indicating various information.

One case of the specific indication in the application is provided in the following table.

| The joint encoding design supporting maximum eight antenna ports | |
| --- | --- |
| Signaling bits 1-3 | Signaling |
| | One codeword:<br>Codeword 0, enabled<br>Codeword 1, disabled |
| 0 | 1 Layer, antenna port 7<br>SCID = 0 |
| 1 | 1 Layer, antenna port 7<br>SCID = 1 |
| 2 | 1 Layer, antenna port 8<br>SCID = 0 |
| 3 | 1 Layer, antenna port 8<br>SCID = 1 |
| 4 | 2 Layers, antenna ports 7, 8, |
| 5 | 3 Layers, antenna ports 7, 8, 9 |
| 6 | 4 Layers, antenna ports 7, 8, 9, 10, |
| 7 | Preserved |
| | Two codewords:<br>Codeword 0, enabled<br>Codeword 1, enabled |
| 0 | 2 Layers, antenna ports 7, 8,<br>SCID = 0 |
| 1 | 2 Layers, antenna ports 7, 8,<br>SCID = 1 |
| 2 | 3 Layers, antenna ports 7 to 9, |
| 3 | 4 Layers, antenna ports 7 to 10, |
| 4 | 5 Layers, antenna ports 7 to 11 |
| 5 | 6 Layers, antenna ports 7 to 12 |
| 6 | 7 Layers, antenna ports 7 to 13 |
| 7 | 8 Layers, antenna ports 7 to 14 |

The relation between the state and the signaling bit value of each above embodiment can be exchanged at will, and all the descriptions are included in the invention scope only if the state is the same.

Although for the example objective, the preferable embodiments of the present invention are already disclosed, those skilled in the art will realize that various kinds of improvement, increase and replacement are possible, therefore, the above embodiment is not intended to limit the scope of the present invention.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limited to any specific form of the combination of the hardware and software.

INDUSTRIAL APPLICABILITY

Through adding new indication signaling, the present invention indicates different joint encoded parameters during the multi-user MIMO data transmission and supports the MIMO multi-user transmission based on the demodulation reference signal.

What we claim is:

1. A method for indicating a transmission parameter, comprising:
when multi-user multi-input multi-output (MIMO) data are transmitted, using a newly-added indication signaling in a downlink control information format to indicate joint encoded parameters;
wherein, when a value of the newly-added indication signaling for a case that a single transport block is enabled is same with a value of the newly-added indication signaling for a case that two transport blocks are enabled, the joint encoded parameters are different, the same value of the newly-added indication signaling refers to different settings on the following one or more joint encoded parameters:

scrambling identity,
antenna port,
spreading code information,
reference signal information;
wherein, when a single transport block is enabled, for part of the value of the newly-added indication signaling, the joint encoded parameter of the scrambling identity is encoded; when two transport blocks are enabled, for part of the value of the newly-added indication signaling, the joint encoded parameter of the scrambling identity is encoded.

2. The method according to claim 1, wherein,
the joint encoded parameters indicated by the indication signaling are different when the receiver capability of user equipment is different, wherein the receiver capability comprises a maximum number of transmitted layers supported by the user equipment.

3. The method according to claim 1, wherein, when the single transport block is enabled,
when the value of the newly-added indication signaling is different, the antenna port for single layer transmission indicated by a new data indicator bit corresponding to disabled transport block is different, wherein, the antenna port indicated by the new data indicator bit is only valid when the total number of transmitted layers is less than 2, otherwise, the antenna port(s) are directly indicated by the newly-added indication signaling; or
the antenna port for the single layer transmission indicated by the new data indicator bit corresponding to the disabled transport block is the antenna port with even index or the antenna port with odd index, wherein, the antenna port with the even index or the odd index indicated by the new data indicator bit is only valid when the total number of transmitted layers is less than 2, otherwise, the antenna port(s) are directly indicated by the newly-added indication signaling; or
the new data indicator bit only corresponding to the disabled transport block indicates the scrambling identity, wherein, the scrambling identity indicated by the new data indicator bit is only valid when the total number of transmitted layers is less than 2, otherwise, the antenna port(s) are directly indicated by the newly-added indication signaling.

4. An evolved node B for indicating a transmission parameter, comprising hardware performing instructions stored in a non-transitory computer readable medium which executes steps in a multiple user multi-input multi-output (MIMO) data downlink transmission module,
the MIMO data downlink transmission module is configured to: when MIMO data are transmitted, use a newly-added indication signaling in a downlink control information format to indicate joint encoded parameters;
wherein, when a value of the newly-added indication signaling for a case that a single transport block is enabled is same with a value of the newly-added indication signaling for a case that two transport blocks are enabled, the joint encoded parameters are different, the same value of the newly-added indication signaling refers to different settings on the following one or more joint encoded parameters:
scrambling identity,
antenna port,
spreading code information,
reference signal information;
wherein, when a single transport block is enabled, for part of the value of the newly-added indication signaling, the joint encoded parameter of the scrambling identity is encoded; when two transport blocks are enabled, for part of the value of the newly-added indication signaling, the joint encoded parameter of the scrambling identity is encoded.

5. The evolved node B according to claim 4, wherein,
the MIMO data downlink transmission module is further configured to: use the indication signaling to indicate performing the joint encoding by using different information when the receiver capability of user equipment is different, wherein the receiver capability comprises a maximum number of transmitted layers supported by the user equipment.

6. The evolved node B according to claim 4, wherein, the MIMO data downlink transmission module is further configured to: when the single transport block is enabled,
through different values of the newly-added indication signaling, make the antenna port for single layer transmission indicated by a new data indicator bit corresponding to disabled transport block be different, wherein, the antenna port indicated by the new data indicator bit is only valid when the total number of transmitted layers is less than 8, otherwise, the antenna port(s) are directly indicated by the newly-added indication signaling; or
use the new data indicator bit corresponding to the disabled transport block to indicate the antenna port for the single layer transmission to be the antenna port with even index or the antenna port with odd index, wherein, the antenna port with the even index or the odd index indicated by the new data indicator bit is only valid when the total number of transmitted layers is less than 2, otherwise, the antenna port(s) are directly indicated by the newly-added indication signaling; or
use the new data indicator bit only corresponding to the disabled transport block to indicate the scrambling identity, wherein, the scrambling identity indicated by the new data indicator bit is only valid when the total number of transmitted layers is less than 2, otherwise, the antenna port(s) are directly indicated by the newly-added indication signaling.

7. The method according to claim 1, wherein
the joint encoded parameters indicated by the value of the newly-added indication signaling includes SCID for the case that a single transport block is enabled, and the joint encoded parameters indicated by the same value of the newly-added indication signaling excludes SCID for the case that two transport blocks are enabled.

8. The method according to claim 1, wherein
for the case that single transport block is enabled, the joint encoded parameters includes SCID when the value of the newly-added indication signaling is greater than 2;
for the case that two transport blocks are enabled, the joint encoded parameters includes SCID when the value of the newly-added indication signaling is greater than 1.

9. The method according to claim 1, wherein
for the case that single transport block is enabled, the joint encoded parameters includes SCID when the total number of transmitted layers is less than 2,
for the case that two transport blocks are enabled, the joint encoded parameters includes SCID when the total number of transmitted layers is less than 3.

10. The method according to claim 1, wherein
the newly-added indication signaling includes 3 bits which has 8 values;
for a case that a single transport block is enabled, a first value indicates 1 Layer, antenna port 7 and SCID=0, a second value indicates 1 Layer, antenna port 7 and scrambling identity (SCID)=1, a third value indicates 1 Layer, antenna port 8, and SCID=0, a fourth value indicates 1 Layer, antenna port 8, and SCID=1, a fifth value indicates 2 Layers, antenna ports 7 and 8, a sixth value indicates 3 Layers, antenna ports 7, 8 and 9, a seventh value indicates 4 Layers, antenna ports 7, 8, 9 and 10;

for a case that two transport blocks are enabled, the first value indicates 2 Layers, antenna ports 7 and 8, and SCID=0, the second value indicates 2 Layers, antenna ports 7 and 8 and SCID=1, the third value indicates 3 Layers and antenna ports 7 to 9, the fourth value indicates 4 Layers and antenna ports 7 to 10, the fifth value indicates 5 Layers and antenna ports 7 to 11, the sixth value indicates 6 Layers and antenna ports 7 to 12, the seventh value indicates 7 Layers and antenna ports 7 to 13, an eighth value indicates 8 Layers and antenna ports 7 to 14.

11. The evolved node B according to claim 4, wherein the joint encoded parameters indicated by the value of the newly-added indication signaling includes SCID for the case that a single transport block is enabled, and the joint encoded parameters indicated by the same value of the newly-added indication signaling excludes SCID for the case that two transport blocks are enabled.

12. The evolved node B according to claim 4, wherein for the case that single transport block is enabled, the joint encoded parameters includes SCID when the value of the newly-added indication signaling is greater than 2; for the case that two transport blocks are enabled, the joint encoded parameters includes SCID when the value of the newly-added indication signaling is greater than 1.

13. The evolved node B according to claim 4, wherein for the case that single transport block is enabled, the joint encoded parameters includes SCID when the total number of transmitted layers is less than 2 for the case that two transport blocks are enabled, the joint encoded parameters includes SCID when the total number of transmitted layers is less than 3.

14. The evolved node B according to claim 4, wherein the newly-added indication signaling includes 3 bits which has 8 values;

for a case that a single transport block is enabled, a first value indicates 1 Layer, antenna port 7 and SCID=0, a second value indicates 1 Layer, antenna port 7 and scrambling identity (SCID)=1, a third value indicates 1 Layer, antenna port 8, and SCID=0, a fourth value indicates 1 Layer, antenna port 8, and SCID=1, a fifth value indicates 2 Layers, antenna ports l and 8, a sixth value indicates 3 Layers, antenna ports 7, 8 and 9, a seventh value indicates 4 Layers, antenna ports 7, 8, 9 and 10;

for a case that two transport block are enabled, the first value indicates 2 Layers, antenna ports 7 and 8, and SCID=0, the second value indicates 2 Layers, antenna ports 7 and 8 and SCID=1, the third value indicates 3 Layers and antenna ports 7 to 9, the fourth value indicates 4 Layers and antenna ports 7 to 10, the fifth value indicates 5 Layers and antenna ports 7 to 11, the sixth value indicates 6 Layers and antenna ports 7 to 12, the seventh value indicates 7 Layers and antenna ports 7 to 13, an eighth value indicates 8 Layers and antenna ports 7 to 14.

15. The method according to claim 1, wherein, the spreading code information includes a length of a spreading code and a specific spreading code.

16. The method according to claim 1, wherein, the reference signal information includes a reference signal pattern or a reference signal mode, the reference signal pattern and the reference signal mode are equivalent, and the reference signal pattern is corresponding to the unique reference signal mode, while the reference signal pattern is able to be confirmed through the corresponding reference signal mode.

17. The evolved node B according to claim 4, wherein, the spreading code information includes a length of a spreading code and a specific spreading code.

18. The evolved node B according to claim 4, wherein, the reference signal information includes a reference signal pattern or a reference signal mode, the reference signal pattern and the reference signal mode are equivalent, and the reference signal pattern is corresponding to the unique reference signal mode, while the reference signal pattern is able to be confirmed through the corresponding reference signal mode.

* * * * *